US00H002118H

(19) United States

(12) Statutory Invention Registration

Winter

(10) Reg. No.: US H2118 H

(43) Published: May 3, 2005

(54) PLASTICS LIQUEFACTION MELT TANK AGITATOR COUPLED WITH SOLIDS REMOVAL

(75) Inventor: John D. Winter, Independence, KS (US)

(73) Assignee: Texaco Inc., White Plains, NY (US)

(21) Appl. No.: 09/626,538

(22) Filed: Jul. 27, 2000

(51) Int. Cl.[7] ..... B01F 5/04

(52) U.S. Cl. ..... 422/224

(58) Field of Search ..... 422/244

*Primary Examiner*—Michael J. Carone
*Assistant Examiner*—M. Thomson
(74) *Attorney, Agent, or Firm*—Howrey Simon Arnold & White

(57) ABSTRACT

The present invention relates to a liquefaction reactor with three distinct elements. First, an anchor type mixer with vertical blades near the reactor wall is used to prevent accumulation of viscous materials near the reactor wall. Second, the center shaft of the anchor mixer doubles as an auger mixer to provide vertical mixing and to draw any floating, unmelted waste below the surface. Finally, a dead zone nozzle at the bottom of the reactor is used to accumulate inorganic, undissolved solids and facilitate removal of these solids.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PLASTICS LIQUEFACTION MELT TANK AGITATOR COUPLED WITH SOLIDS REMOVAL

BACKGROUND OF THE INVENTION

Millions of gallons of fuel oil and its equivalent are discarded every year through the disposal of plastic wastes and other waste material. Recycling of these wastes is of increasing importance as incineration and landfilling become more expensive and the acceptance of these methods is decreasing. It should be noted that rubber and plastic wastes are produced originally from crude oil and can be thermally cracked into fuels or petrochemicals. However, these wastes generally contain inorganic materials, fibers, glass, dust and poor thermal conducting materials, which are far more difficult to be treated effectively.

The quantity of organic-containing solid wastes increases rapidly at the rate of millions of tons per year. These organic-containing solid wastes are equivalent to approximately thousands of billions kcal, which is a huge amount of thermal potential energy/heat and about half are from petroleum products. These solid wastes such as: printed circuit board wastes, rubber wastes, plastic wastes, scrap tire, organic wastes from auto shredder residues, oil sludge/sediment etc., are usually mixed with inorganic materials i.e., iron-wires, metal, fiber, wood, glass. Generally organic matter pollutes the solid wastes and this increases the difficulty of resource recovering treatment.

In general, thermal treatment of wastes can recover energy and resources. These technologies include incineration, pyrolysis, oil liquefaction and gasification. Wastes incineration produces $CO_2$ and $H_2O$, but also produces some particulate, heavy metals, halides, $SO_x$, and $NO_x$. The accumulated pollutants have a negative impact on the environment. In addition the emission of PCCDS and PCDFS is also a serious problem. Under the condition of absence of oxygen, the macro organic compounds are cracked into smaller molecules and are recovered as the light hydrocarbons gases and light oil in the pyrolysis process. However, successful operation process for commercial purposes with direct pyrolysis are very few. This is due to engineering and operational problems such as (a) low heat transfer coefficient of the solid organic matter which affect the efficiency of the pyrolysis process; (b) high viscosity of products make the pyrolysis process more difficult; and (c) the pyrolysis products are not economically attractive, generally.

Many direct pyrolysis processes have been reported to have technical or economic difficulties. Indeed, pyrolysis is complicated by the fact that the polymeric material wastes are poor conductors and degradation of these macromolecules requires considerable amount of energy. The liquefaction process involves treating solid wastes with hot waste lubricating oil at temperatures between about 435–800° F. (about 225–425° C. and below general pyrolysis temperatures). Basically, organic macromolecules are soluble in heavy oils only if they are cracked effectively. Above about 435° F. (about 225° C.), the C—C bonds of the polymeric matrix can be disrupted and dissolved into the oil.

In a typical liquefaction process, solid wastes are liquefied in hot oil or recycled product heavy oils at relatively low temperatures. The liquefaction process comprises the main step of heat transfer by the hot oil to swell the structure of the highly polymeric organic material and lead to selective bond breaking. Therefore, the major products are oils, and can be separated easily from the mixtures of inorganic materials. The reaction temperature is usually less than about 750° F. (about 400° C.), which is much lower than that of any other known thermal treatment technologies. The need of the gas treatment equipment also becomes much less due to the lower quantity of the gas products. This proposed process can treat wastes mentioned above such as: printed circuit board wastes, scrap tire, plastic wastes, and other difficult-to-treat wastes as well as used motor oil. Hence the goal of treating several kinds of wastes simultaneously can be achieved.

The liquefaction process usually takes place in a liquefaction reactor, where the solid wastes are dissolved and suspended into the hot oil or heavy recycled product oils. While the agitation requirements of this process have been demonstrated to be undemanding, the high viscosity of the mixture in the liquefaction reactor, the presence of non-soluble polymers and inorganic debris, and the tendency of any unmelted feed waste to float on the viscous fluid surface must all be accounted for.

In small-scale liquefaction processes, such as on the pilot plant scale, liquefaction reactors are small enough that screens can be used to filter out the solid material from the liquefied waste. In large-scale commercial plants, screens are generally not used. Thus, there are concerns about the behavior of solid materials in those commercial plants. Additionally, unmelted waste small-scale units generally don't have the floating problems that commercial scale plants have. Thus commercial plant liquefaction reactors must have an agitation device that is better suited to drawing unmelted waste below the liquid surface, while minimizing the amount of gas drawn below the liquid surface and the depth that trapped gas is forced to.

SUMMARY OF THE INVENTION

The present invention relates to a liquefaction reactor with three distinct elements. First, an anchor type mixer with vertical blades near the reactor wall is used to prevent accumulation of viscous materials near the reactor wall. Second, the center shaft of the anchor mixer doubles as an auger mixer to provide vertical mixing and to draw any floating, unmelted waste below the surface. Finally, a dead zone nozzle at the bottom of the reactor is used to accumulate inorganic, undissolved solids and facilitate removal of these solids.

DESCRIPTION OF ILLUSTRATIVE EMBODIMENTS

Figure 1:
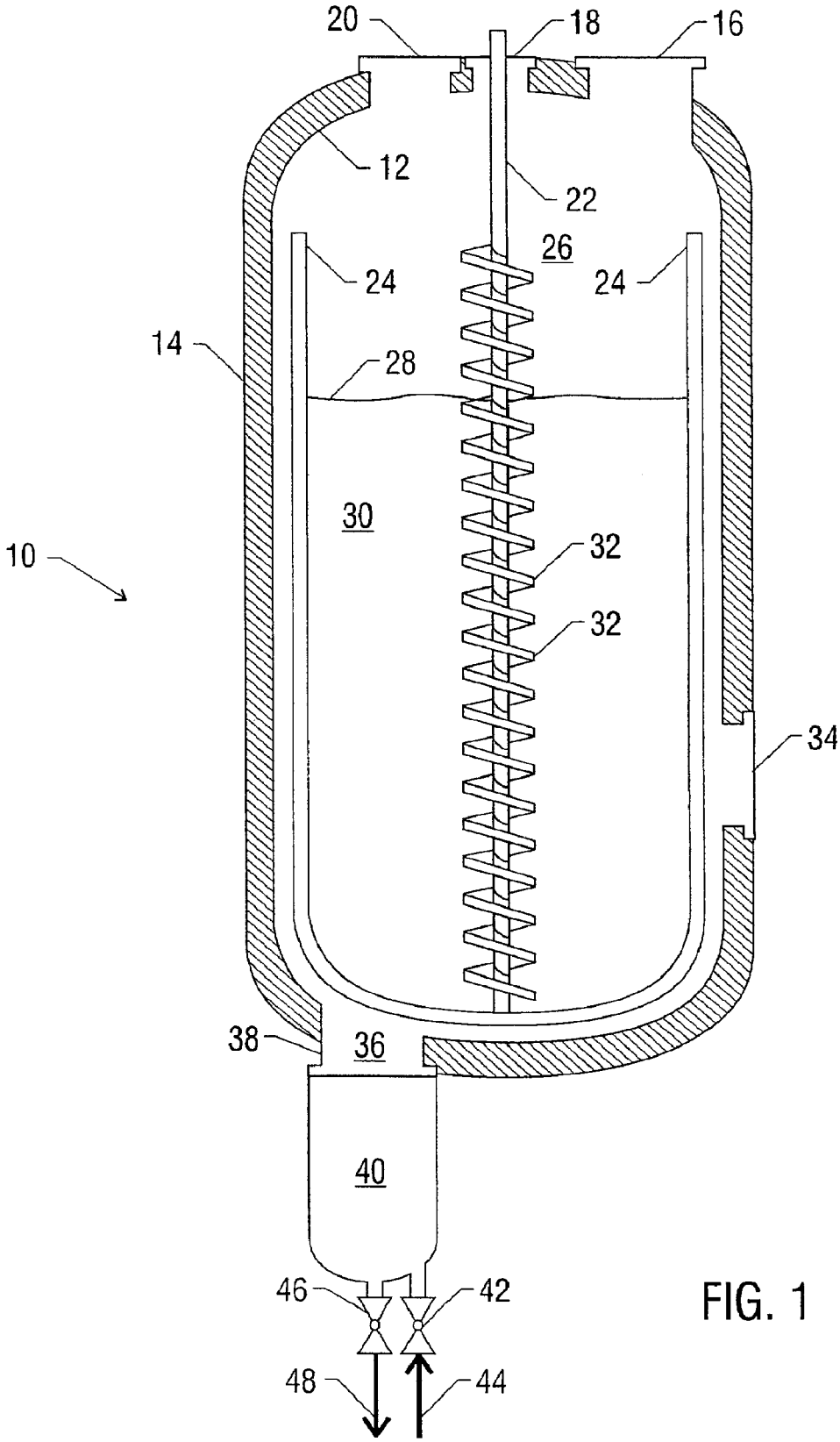
FIG. 1 shows a longitudinal section diagram of the disclosed liquefaction reactor with a modified anchor/auger mixer and a dead space for solids collection.

One embodiment of the present invention is to combine three elements into a liquefaction reactor. The first element, an anchor mixer, named so because of the 'anchor' shaped mixing apparatus, with vertical blades near the reactor wall is used to provide bulk mixing and to sweep settled solids in the bottom of the reactor into the second element, a solids removal nozzle. The anchor mixer vertical blades are near the wall to prevent accumulation of more viscous material near the wall since the walls will generally be cooler than the center of the reactor. The vertical elements could be angled to improve radial mixing.

The vertical blades of the anchor mixer are connected to a central rotating shaft, usually operated at a slow turning speed, as high speed mixers are impractical with high viscosity materials. The third element of this invention is to modify this central rotating shaft into an auger mixer. The center auger mixer mechanism includes a helical flight or flights and an envelope of revolution of substantially less maximum radius than that of the anchor mixer vertical elements. This center auger mixer is used to provide vertical mixing and to draw any floating waste and some entrained gas below the surface. By changing the pitch of the flights and speed of the mixer, it will be easy to find the optimum balance between pulling floating particles below the solution surface and minimizing entraining gas into the reactor outlet.

The second element, the solids removal nozzle, is a nozzle cut from the vessel centerline at the bottom of the vessel. This solids removal nozzle is used to accumulate the inorganic and undissolved solids debris. Depending on the amount and the nature of the solids in the feed, the solids removal nozzle can be equipped with a valve and a reservoir to allow removal of solids during the continuous operation of the liquefaction reactor. This reservoir could, though, simply be changed when the reactor is out of operation. The solids removal nozzle and reservoir should be equipped with heat tracing to keep the material liquid during operation.

It would also be prudent to provide an inlet nozzle in the solids removal reservoir for a split stream of the liquefied waste oil removed from the reactor to be returned to the reactor so that a liquid upflow could be provided counter current to the settling solids. Other mixing oil or steam could also be used prior to removal of the accumulated solids to minimize the liquefied waste oil adhering to the solids removed for disposal.

Referring to the drawing, FIG. 1 illustrates the preferred embodiment of this invention, the central item being liquefaction reactor 10. The reactor is enclosed by wall 12, which is surrounded by insulation 14 so as to limit the heat loss from the reactor. Feed inlet nozzle 16 is used to introduce the waste/oil mixture to the reactor. This mixture may have been premixed and introduced as one stream, but it is also within the scope of this invention to introduce the oil and the waste material separately into the reactor through two separate nozzles. Common wastes used are printed circuit board wastes, rubber wastes, plastic wastes, scrap tire, organic wastes from auto shredder residues, oil sludge/sediment etc. The wastes are usually mixed with inorganic materials such as iron-wires, metal, fiber and glass. Oils used are any hydrocarbon liquids, usually a hot hydrocarbon liquid recycled from a thermal cracking process the waste/oil mixture is subsequently processed in after liquefaction reactor 10.

The waste/oil mixture forms a liquid portion 30 and liquid level 28 in the liquefaction reactor 10. Any gasses that evolve from the mixing of the waste/oil mixture accumulate in open space 26 of the reactor above level 28. The gasses are removed from the reactor through outlet nozzle 20, generally at a rate that keeps a constant pressure on the reactor.

Through inlet 18 comes the main mixing means for the liquefaction reactor 10, the anchor mixer. The Anchor mixer has shaft 22 that extends longitudinally the length of the reactor. Shaft 22 is rotated by a rotating means (not shown) located outside the reactor. At the bottom of the shaft, vertical blades 24 are attached. Vertical blades 24 follow reactor wall 12 to a point above liquid level 28. The clearance between vertical blades 24 and reactor wall 12 must be great enough so as to allow the vertical blades 24 to rotate within the reactor without touching the wall 12. The clearance, though, must be small enough to allow vertical blades 24 to scrape away any higher viscosity material that might accumulate along wall 12 of the liquefaction reactor. Two vertical blades are shown on this drawing, but it is within the scope of this invention to attach one or more vertical blades to shaft 22. Some, or all, of vertical blades 24 could be inclined inward toward the center of the reactor so as to improve radial mixing.

Along shaft 22 runs the generally helically shaped flights 32 that runs from a point above liquid level 28 down to the end of shaft 22 near the point where vertical blades 24 attach to shaft 22. The combination of shaft 22 and helically shaped flights 32 forms the auger mixer aspect of the invention. It is within the scope of this invention that the pitch, length, and frequency of flights 32 could be varied in may possible combinations, and are likely designed as a function of the rotating speed of the mixing apparatus and the size of the reactor. The pitch, length, and frequency of flights 32 should be designed sufficiently to draw any waste material floating on liquid level 28 down in to the liquid 30, while minimizing entraining any gas from open space 26 of the reactor.

Any inorganic material or undissolved solids in liquid 30 will settle toward the bottom of the liquefaction reactor. I he portion of vertical blades 24 that extend out from shaft 22 will assist in sweeping the settled solids into the solids removal nozzle 38 and void space 36. Attached to solids removal nozzle 38 is a solids removal reservoir 40. Solids removal reservoir 40 may be removable from liquefaction reactor 10 so as to remove any solids from reservoir 40 when the reactor is out of service. Alternatively, reservoir 40 may be equipped with a valve 46 and an outlet means 48 so as to continuously or periodically remove the solids while the reactor is in service. Nevertheless, reservoir 40 must be a dead space, in that it must not be subjected to the mixing caused by vertical blades 24. Reservoir 40 is commonly enclosed in a heat tracing means (not shown) so as to keep the dead space heated during times the reactor is in service.

Liquefied waste is removed from the reactor through valve 34, at a rate similar to that of the rate of the feed to the reactor so as to maintain a constant level 28 in the reactor. The liquefied waste is usually sent to a thermal cracking step, so as to convert the liquefied waste into useful, lighter boiling hydrocarbons. Valve 42 illustrates an inlet valve that may be used to inject material from line 44 into the reactor, including a split stream of liquefied waste removed through nozzle 34. This would provide a liquid upflow that would be counter current to the settling solids in reservoir 40. Other types of oil or steam could also be injected prior to removal of the accumulated solids so as to minimize the amount of oil adhering to the solids before they are removed.

While the apparatuses and methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. An apparatus for liquefying solid waste material in hydrocarbon oil, comprising:

a) a waste inlet means;

b) a hydrocarbon oil inlet means;

c) an anchor mixer comprising a center shaft and a plurality of vertical blades;

d) helically shaped flights that run along the center shaft;

e) a waste/oil outlet means; and f) a dead space for collecting inorganic material and undissolved solids.

* * * * *